UNITED STATES PATENT OFFICE.

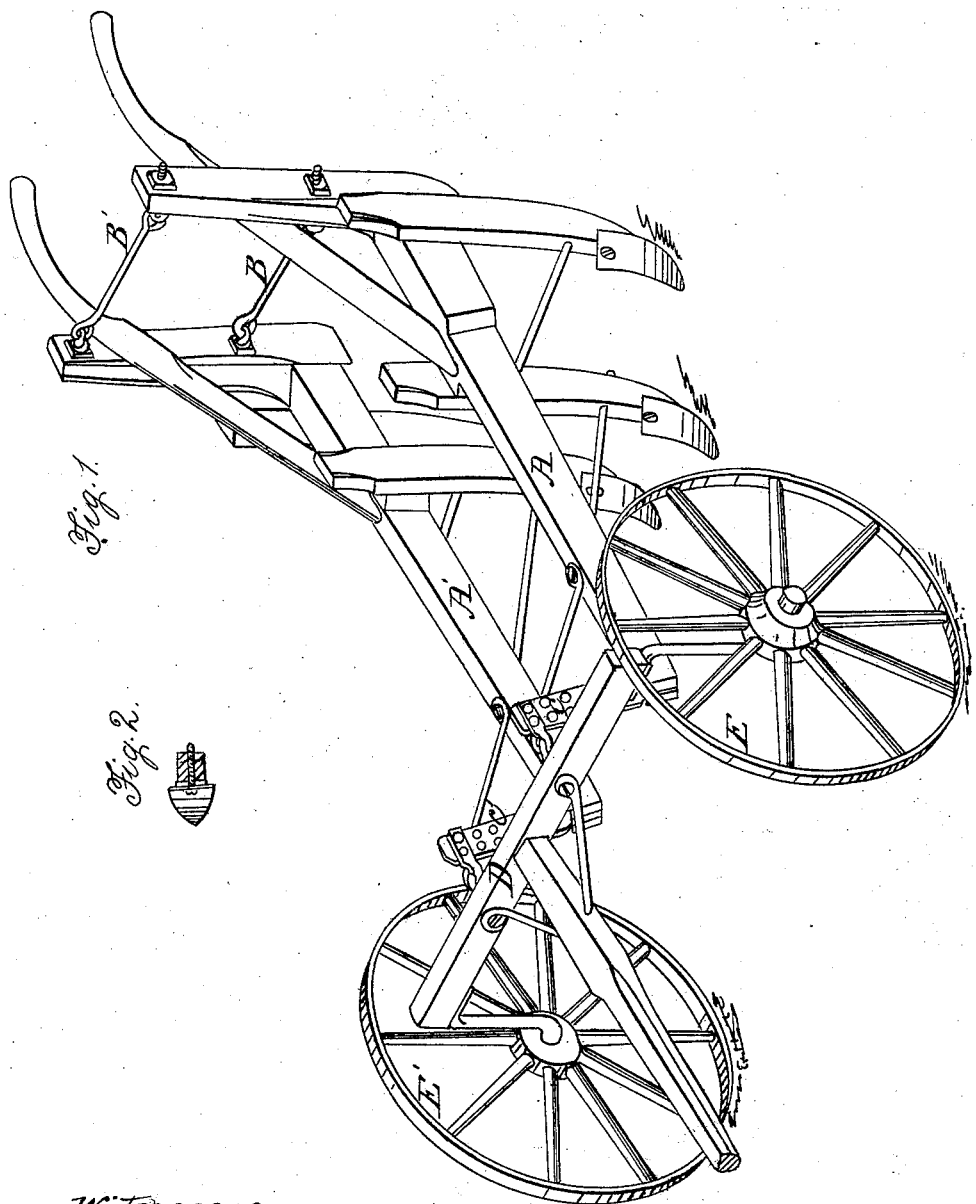

THOMAS McQUISTON, OF MORNING SUN, OHIO.

IMPROVEMENT IN CULTIVATORS.

Specification forming part of Letters Patent No. 25,843, dated October 18, 1859.

*To all whom it may concern:*

Be it known that I, THOMAS MCQUISTON, of Morning Sun, Preble county, Ohio, have invented a certain new and useful Improvement in Double-Wheeled Cultivators; and I hereby declare the following to be a full, clear, and exact description of the same, reference being had to the accompanying drawings, making part of this specification.

This is an improvement in double-wheeled cultivators; and it consists in a construction and arrangement of parts having for their object the greater manageability and more effective action of this class of implements.

In the accompanying drawings, Figure 1 is a perspective view of an implement illustrating my invention. Fig. 2 is a horizontal section through the share and sheth, showing the means of adapting the latter to throw the earth in either direction.

A A' are two common right and left cultivators, loosely shackled together behind by rods B B'. Rising from the front end of each cultivator-beam is a bracket or elbow, C C', by means of which each beam is loosely jointed or shackled to an axle, D, having the represented bent form, so as to elevate its middle portion to a level, or nearly so, with the tops of the wheels E E'. Perforations in these brackets permit the adjustment of the pitch of the implement.

It is obvious that as the beams are rigidly attached to their respective sheths the two sets of shares will severally possess the steadfastness, of course, known to be incident to such construction, while on the other hand it is also apparent that the loose shackling to each other and to the beam of those two members of the cultivator permits the operator to simultaneously cast both sets to one or the other side, and thus enable an instant and definite change of course. The elevated position of the axle and tongue and of the customary appendages of the latter permits the whiffletrees to extend over the wheels, and thus affords a convenient attachment of the draft both in respect to height and proximity to the work, the latter feature evidently enabling the implement to be turned more readily and within a shorter radius—a very important item for tillage among young plants, whose cultivation is also, by the described form and arrangement of axle, &c., further greatly facilitated by the fact that the implement can be made to straddle the row without danger of bruising the tops of the plants.

A reversible wedge-shaped plate is inserted beneath the share, as seen in Fig. 2, so as to adapt it to throw the earth either toward or from the plants, as desired.

Landside-plowshares may evidently be substituted for the shovels shown in the drawings without departing from the principles of the invention.

I claim as new and of my invention herein, and desire to secure by Letters Patent—

The described arrangement of the elevated axle D, beams A A', brackets C C', and rods B B', the whole being constructed in the manner and for the purposes set forth.

In testimony of which invention I hereunto set my hand.

THOMAS McQUISTON.

Witnesses:
PHILIP MURRAY,
JAMES R. H. BERNARD.